United States Patent
Yano et al.

(10) Patent No.: US 9,626,551 B2
(45) Date of Patent: Apr. 18, 2017

(54) COLLATION APPARATUS AND METHOD FOR THE SAME, AND IMAGE SEARCHING APPARATUS AND METHOD FOR THE SAME

(71) Applicant: CANON KABUSHIKI KAISHA, Tokyo (JP)

(72) Inventors: Kotaro Yano, Tokyo (JP); Hiroshi Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/713,048

(22) Filed: May 15, 2015

(65) Prior Publication Data

US 2015/0339516 A1 Nov. 26, 2015

(30) Foreign Application Priority Data

May 20, 2014 (JP) .................................. 2014-104004

(51) Int. Cl.
*G06K 9/00* (2006.01)
*G06T 7/00* (2017.01)
(Continued)

(52) U.S. Cl.
CPC ......... *G06K 9/00281* (2013.01); *G06F 17/30* (2013.01); *G06K 9/00288* (2013.01);
(Continued)

(58) Field of Classification Search
CPC ............. A61B 5/1176; G06K 9/00221; G06K 9/00369; G06K 9/00234; G06K 9/00281;
(Continued)

(56) References Cited

U.S. PATENT DOCUMENTS

2006/0271525 A1* 11/2006 Sukegawa .......... G06K 9/00288
2009/0080711 A1* 3/2009 Yokoi ................ G06K 9/00362
382/116

(Continued)

OTHER PUBLICATIONS

O. Parkhi et al. "On-The-Fly Specific Person Retrieval", International Workshop on Image Analysis for Multimedia Interactive Services, Department of Engineering Science, University of Oxford (2012). pp. 1-4.

(Continued)

*Primary Examiner* — Bhavesh Mehta
*Assistant Examiner* — Narek Zohrabyan
(74) *Attorney, Agent, or Firm* — Rossi, Kimms & McDowell LLP

(57) ABSTRACT

A collation apparatus that collates an input image with registered images includes: a feature extracting unit extracting feature quantities from a region of an object in the input image; a calculating unit calculating, per each of the feature quantities, similarity degrees between the feature quantities extracted from the input image and corresponding feature quantities of the registered image, for each of the registered images; an integrating unit integrating, using a parameter, the similarity degrees for the feature quantities; an estimation unit estimating as to whether or not the object in the input image is identical with an object in each of the registered images; and a parameter learning unit learning the parameters to be used by the integrating unit, based on an estimation result of the estimation unit and the similarity degree integrated by the integrating unit.

12 Claims, 9 Drawing Sheets

(51) Int. Cl.
*H04N 5/247* (2006.01)
*G06F 17/30* (2006.01)
*G06K 9/62* (2006.01)

(52) U.S. Cl.
CPC ............ *G06K 9/6293* (2013.01); *G06T 7/003* (2013.01); *G06T 7/0044* (2013.01); *H04N 5/247* (2013.01); *G06T 2207/10004* (2013.01); *G06T 2207/10016* (2013.01); *G06T 2207/10152* (2013.01); *G06T 2207/20081* (2013.01); *G06T 2207/30201* (2013.01); *G06T 2207/30221* (2013.01)

(58) Field of Classification Search
CPC ........... G06K 9/00248; G06K 9/00268; G06K 9/6232; G06K 9/00288; G06K 9/00275; G10L 17/00; G06F 17/30793; G06T 7/0079; G06T 7/408
USPC .................................. 382/118, 155, 156, 159
See application file for complete search history.

(56) References Cited

U.S. PATENT DOCUMENTS

| 2010/0158315 | A1* | 6/2010 | Martin | G06F 17/30247 382/103 |
| 2012/0288148 | A1* | 11/2012 | Suzuki | G06K 9/00281 382/103 |
| 2014/0270370 | A1* | 9/2014 | Saito | G06K 9/00288 382/103 |

OTHER PUBLICATIONS

P. Viola et al. "Rapid Object Detection using a Boosted Cascade of Simple Features", Proceedings of the IEEE Conference on Computer Vision and Pattern Recognition (2001). pp. 1-9.

N. Dalal et al. "Histograms of Oriented Gradients for Human Detection", Proceedings of the IEEE Conference on Computer Vision and Pattern Recognition (2005). pp. 1-8.

X. Zhu et al. "Face Detection, Pose Estimation, and Landmark Localization in the Wild", Proceedings of the IEEE Conference on Computer Vision and Pattern Recognition (2012). pp. 1-8.

* cited by examiner

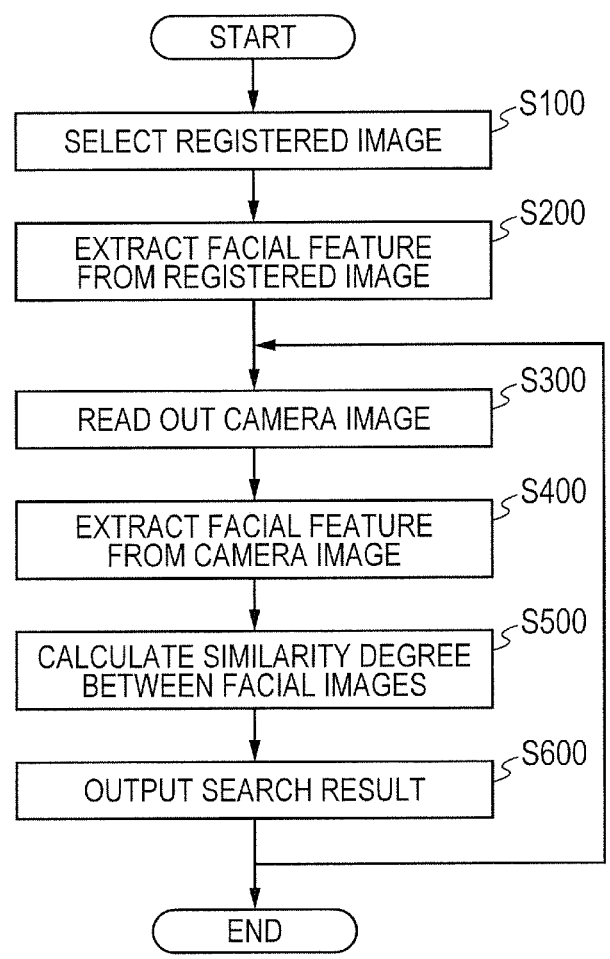

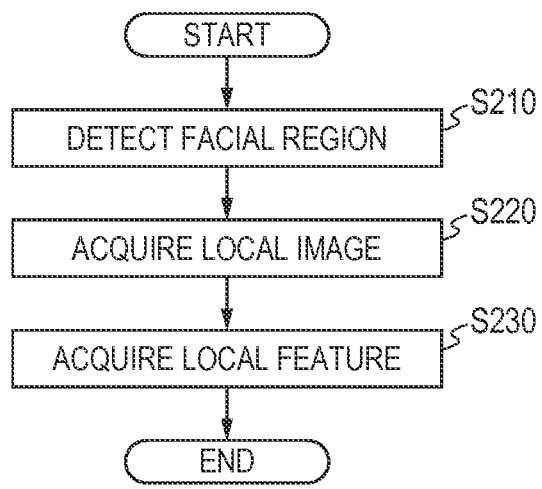
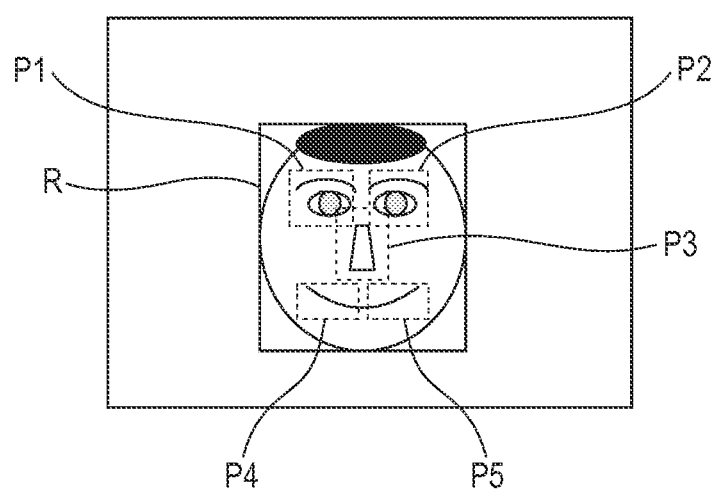

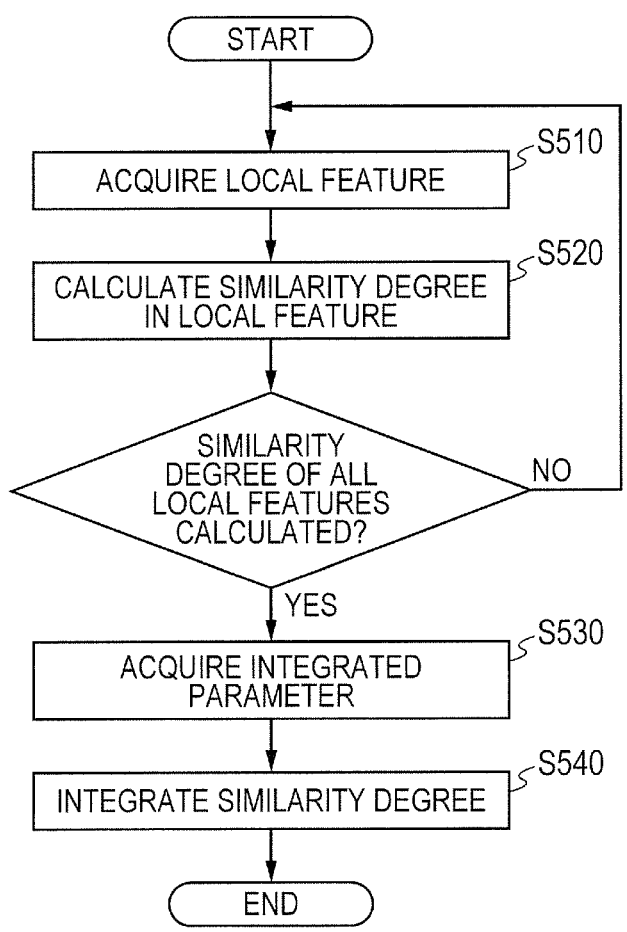

COLLATION APPARATUS AND METHOD FOR THE SAME, AND IMAGE SEARCHING APPARATUS AND METHOD FOR THE SAME

BACKGROUND OF THE INVENTION

Field of the Invention

The present invention relates to a collation apparatus that collates an input image with a plurality of registered images, and an image searching apparatus using the collation apparatus.

Description of the Related Art

In recent years, an image searching apparatus that searches an image in which a specific object is photographed from a large amount of images has been proposed. In such an image searching apparatus, it is useful in particular to search a specific person. As one of the uses, there is a service of registering photos of faces of persons who have competed in a civil marathon beforehand, searching the registered persons from photos photographed at a plurality of points of a marathon course, and providing competitors with the photos.

Here, collation processing of face images can be utilized in a search of photos of persons, however, since illumination conditions are different respectively at individual photographing points on the course, it becomes difficult to collate faces by influence of brightness, colors, shadows or the like of the images. There is also a problem that, since photographing from the front cannot be performed depending on the photographing point, the face image photographed from an oblique direction needs to be collated. On the other hand, it may be considered to search the photos of the persons by collating something other than faces.

One method is to recognize a player number of a person, however, it is impossible to search an image in which the player number cannot be seen. Also, it may be considered to perform collation by colors or patterns of clothes, however, among the images under the different illumination conditions, the collation is affected more than the collation of faces. Considering the above, it is clear that, though the player number and clothes are used as a method of collation, it is better to be combined with a face collation processing with excellent performance.

As a system of collating faces in order to search a personal image, for example, there is a method described in On-the-fly specific person retrieval, in International Workshop on Image Analysis for Multimedia Interactive Services, by Parkhi et al. (2012). Here, image search on the Internet is utilized, a plurality of face images of celebrities are collected beforehand by inputting names, and a person is searched from video images by learning a face model of a specific person from the collected face images. However, since it is assumed to collect many face images from the Internet in the method, a search target is limited to celebrities. Also, an essential problem on a difference between a registered face photo and a condition during photographing is not solved.

An object of the present invention is to provide a collation apparatus and method capable of highly accurately collating a person even when a photographing condition or a camera installation condition is different, in an image searching apparatus that searches a specific person from a plurality of camera images, in order to solve the above-described problem.

SUMMARY OF THE INVENTION

According to an aspect of the present invention, a collation apparatus for collating an input image with a plurality of registered images comprises: a feature extracting unit configured to extract a plurality of feature quantities from a region of an object in the input image; a calculating unit configured to calculate, per each of the feature quantities, a plurality of similarity degrees between the plurality of feature quantities extracted from the input image and corresponding plurality of feature quantities of the registered image; an integrating unit configured to integrate, using a parameter, the plurality of similarity degrees corresponding to the plurality of feature quantities into an integrated similarity degree; an estimation unit configured to estimate as to whether the object in the input image is identical with an object in each of the plurality of registered images; and a parameter learning unit configured to learn the parameters to be used by the integrating unit, based on a result of the estimation by the estimation unit and the integrated similarity degree.

Further features of the present invention will become apparent from the following description of exemplary embodiments with reference to the attached drawings.

BRIEF DESCRIPTION OF THE DRAWINGS

FIG. 3 is a flowchart illustrating a flow of image collation and image searching processing of the image searching apparatus in the first embodiment.

FIG. 4 is a flowchart illustrating a flow of facial feature extracting processing.

FIG. 5 is a diagram illustrating an example of local regions of a face image.

FIG. 6 is a flowchart illustrating a flow of similarity degree calculating processing.

DESCRIPTION OF THE EMBODIMENTS

Preferred embodiments of the present invention will now be described in detail in accordance with the accompanying drawings.

First Embodiment

Figure 10:
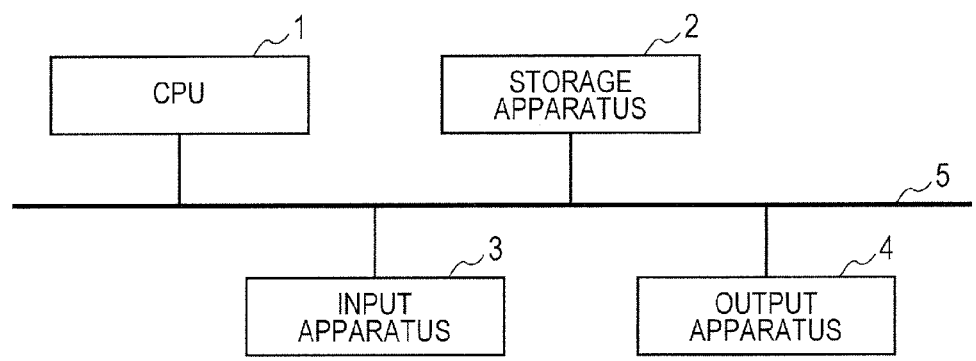
FIG. 10 is a diagram illustrating a hardware configuration of the collation apparatus and the image searching apparatus in the embodiment.

FIG. 10 is a diagram illustrating a hardware configuration of an image searching apparatus according to the present embodiment. A collation apparatus and the image searching apparatus include a CPU (Central Processing Unit) 1, a storage apparatus 2, an input apparatus 3, and an output apparatus 4. The individual apparatuses are communicably connected with each other by a bus 5 or the like.

The CPU 1 controls operations of the collation apparatus and the image searching apparatus, and executes a program stored in the storage apparatus 2 or the like. The storage apparatus 2 is a storage device such as a magnetic storage device or a semiconductor memory, and stores the program read based on the operation of the CPU 1 and data which needs to be stored for a long period of time, or the like. In the present embodiment, by the CPU 1 performing processing according to a procedure of the program stored in the storage apparatus 2, functions and processing according to flowcharts described later in the collation apparatus and the image searching apparatus are embodied.

The input apparatus 3 is a mouse, a keyboard, a touch panel device, a button, or the like, and inputs various kinds of instructions. The output apparatus 4 is a liquid crystal panel, an external monitor, or the like, and outputs various kinds of information.

The hardware configuration of the collation apparatus and the image searching apparatus is not limited to the above-described configuration. For example, the collation apparatus and the image searching apparatus may include an I/O device for performing communication among various kinds of devices. For example, the I/O) device is an input/output unit such as a memory card or a USB cable, and a transmission/reception unit by cables or radio or the like.

Figure 2:
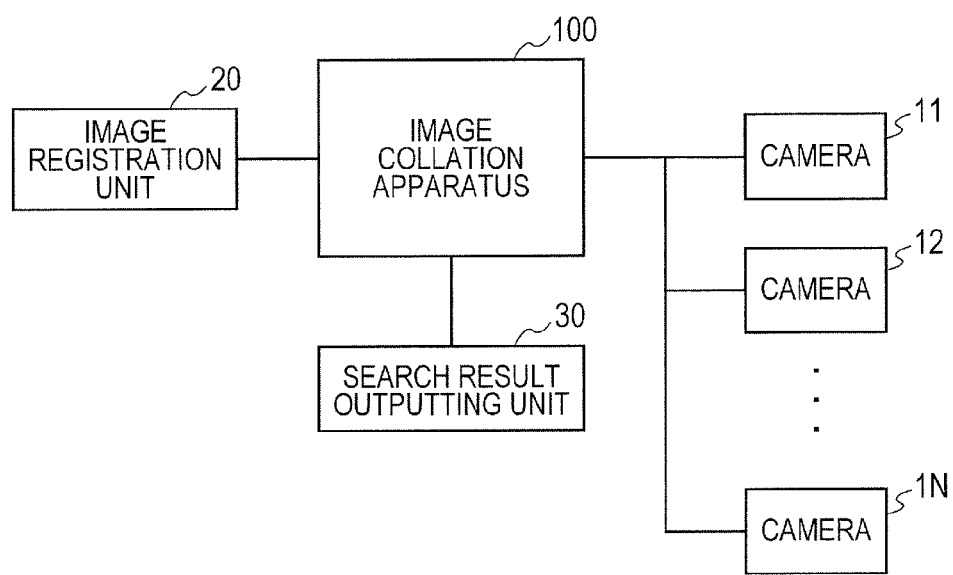
FIG. 2 is a diagram illustrating a configuration of an image searching apparatus in the first embodiment.

As illustrated in FIG. 2, a collation apparatus 100 of the present embodiment is connected with a plurality of cameras (imaging devices) 11, 12, . . . , 1N by a cable or radio. Also, the collation apparatus 100 configures the image searching apparatus together with an image registration unit 20 and a searching result outputting unit 30. The cameras 11, 12, . . . , 1N photograph images at individual points where the cameras are installed respectively. The image registration unit 20 registers a face image of a person to be used in a search together with an identifier linked with the person. The collation apparatus 100 collates the image registered in the image registration unit 20 and the images photographed by the cameras 11, 12, . . . , 1N, and outputs similarity degrees. The searching result outputting unit 30 arranges in ranking and outputs the photographed images from the similarity degrees between each of the plurality of images photographed by the cameras 11, 12, . . . , 1N and the image registered in the image registration unit 20, that are calculated in the collation apparatus 100 respectively.

Figure 1:
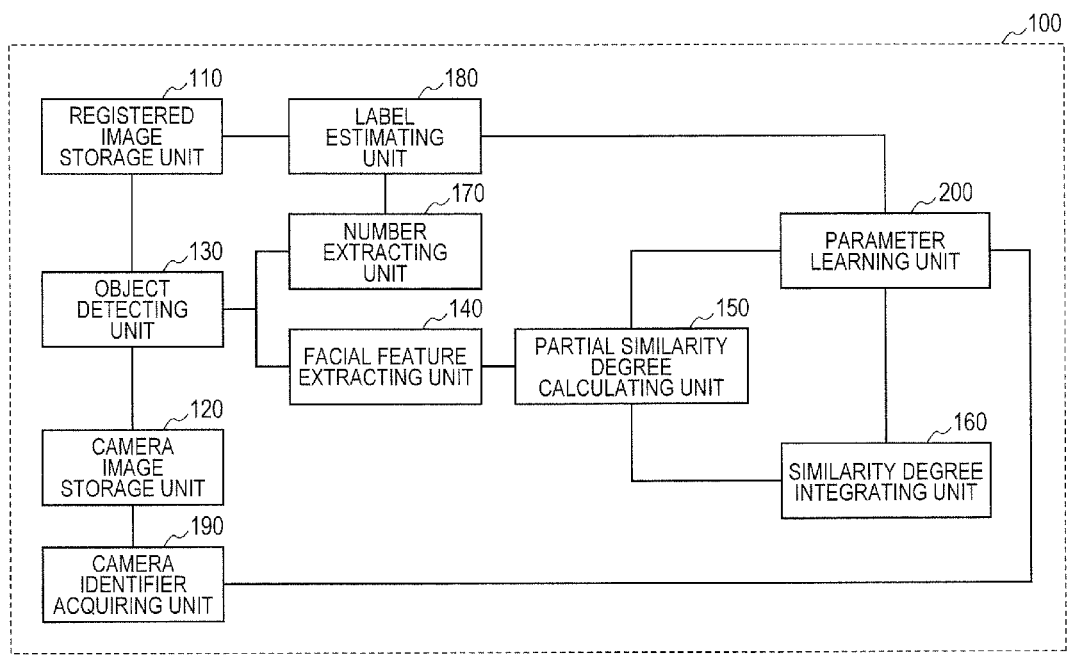
FIG. 1 is a diagram illustrating a functional configuration of a collation apparatus in a first embodiment.

FIG. 1 is a diagram illustrating a functional configuration of the collation apparatus 100 according to the first embodiment. Processing and functions of the collation apparatus 100 are embodied by individual units illustrated in FIG. 1.

A registered image storage unit 110 associates and stores the image registered in the image registration unit 20 and the identifier of the person. In the present embodiment, the identifier of the person expresses a player number of a marathon runner. The registered image storage unit 110 may store not the face image of the person but a feature of the face image.

A camera image storage unit 120 stores the respective images photographed by the cameras 11, 12, . . . , 1N. The individual stored images are managed corresponding to the cameras used for photographing and the photographing time.

An object detecting unit 130 detects a specific object from the images stored in the registered image storage unit 110 and the camera image storage unit 120. In the present embodiment, a face of a person is detected.

A facial feature extracting unit 140 extracts a feature of the face detected in the object detecting unit 130 as a feature quantity related to an object of a collation target. In the present embodiment, the feature of the face is a plurality of feature quantities extracted from local regions in the face image.

A partial similarity degree calculating unit 150 calculates the similarity degrees of the facial features extracted by the facial feature extracting unit 140 from each of the image stored in the registered image storage unit 110 and the images stored in the camera image storage unit 120 with each other. That is, the partial similarity degree calculating unit 150 calculates the similarity degrees of the respective feature quantities (for example, the similarity degree between a right eye in the registered image and a right eye in the camera image, the similarity degree between a left eye in the registered image and a left eye in the camera image, or the like).

A similarity degree integrating unit 160 integrates the plurality of similarity degrees calculated by the partial similarity degree calculating unit 150.

A number extracting unit 170 extracts a number of the person from the images stored in the camera image storage unit 120 based on position information of the face detected in the object detecting unit 130. In the present embodiment, the player number is recognized and extracted from the image of the marathon runner.

A label estimating unit 180 determines whether or not the identifier of the person of the image stored in the registered image storage unit 110 and the number of the person extracted in the number extracting unit 170 coincide, and attaches a label indicating whether or not the persons in the registered image and the camera image are the identical person.

A camera identifier acquiring unit 190 acquires identifiers of the cameras associated with the individual images stored in the camera image storage unit 120.

A parameter learning unit 200 learns an integration parameter to be used in the similarity degree integrating unit 160 for each camera identifier from the similarity degree of the feature quantity calculated by the partial similarity degree calculating unit 150 and the label estimated by the label estimating unit 180.

Hereinafter, an operation of the present embodiment will be described. FIG. 3 is a flowchart illustrating an outline of a flow of image collation and image searching processing. When performing the operation of the present embodiment, it is assumed that the registered images and the camera images are stored respectively in the registered image storage unit 110 and the camera image storage unit 120 beforehand.

First, the input apparatus 3 selects the image (called the registered image, hereinafter) of the person desired to be searched from the images stored in the registered image storage unit 110 (S100).

Next, the object detecting unit 130 and the facial feature extracting unit 140 extract the facial feature from the registered image (S200). Details of facial feature extracting processing will be described later.

Next, the object detecting unit 130 reads the images (called the camera images, hereinafter) stored in the camera image storage unit 120 along a predetermined order (S300). In the camera image storage unit 120, the individual images photographed by the cameras 11, 12, . . . , 1N are managed corresponding to the cameras used for photographing and the photographing time. Here, it is assumed that the camera images photographed using the respective cameras in the order of the cameras 11, 12, . . . , 1N are read from the image in the past in a time sequential manner in a predetermined searching range. To the read camera images, processing of S400 to S600 in FIG. 3 is performed.

The object detecting unit 130 and the facial feature extracting unit 140 extract the facial feature from the camera image similarly to S200 described above (S400).

Next, the partial similarity degree calculating unit 150 and the similarity degree integrating unit 160 calculate the similarity degree between the facial feature of the registered image extracted in S200 and the facial feature of the camera image extracted in S400 (S500). Details of similarity degree calculating processing will be described later. The collation apparatus 100 outputs the obtained similarity degree between the face images.

Then, the searching result outputting unit 30 arranges in ranking and outputs the camera images according to the similarity degrees between the face images obtained in the collation apparatus 100 (S600). That is, the searching result outputting unit 30 compares the obtained similarity degree with the already obtained similarity degrees with respect to the other camera images, and displays the camera images at the output apparatus 4 in a descending order of the similarity degrees.

The processing of S300 to S600 is successively and repeatedly performed to the respective camera images. In the case that a plurality of persons exist in one camera image, the processing of S400 to S500 is performed for the face images of the respective persons and the similarity degree is calculated. In this case, since the plurality of identical persons cannot exist in the single camera image, in S600, the searching result outputting unit 30 defines the similarity degree of the face image whose similarity degree is the highest among the plurality of face images in the camera image as a representative similarity degree of the camera image, and arranges the camera image in ranking.

In the present embodiment, the image of the person is searched based on only the similarity degree of the facial feature, however, when the player number is recognized from the camera image and combined with the similarity degree of the facial feature to perform a search, the search can be highly accurately performed. In parallel with the facial feature extracting processing S400 and the similarity degree calculating processing S500, the number extracting unit 170 extracts the player number from the camera image. For example, the number extracting unit 170 sets a region of a body in a predetermined positional relation with a face region detected in the object detecting unit 130 as a character part detection target region, and collates the image with a character template inside the set region.

The character templates used here are numerals 0 to 9 and capital alphabets A to Z. A character string for which collation results with the plurality of character templates are integrated is defined as the player number. Then, in the case that the player number is extracted, the number extracting unit 170 compares it with the identifier (here, the player number) of the person stored in association with the registered image in the registered image storage unit 110. Then, in the case that the player numbers in the registered image and the camera image coincide, the searching result outputting unit 30 brings the camera image to a high rank in S600.

<Details of Facial Feature Extracting Processing>

FIG. 4 is a flowchart illustrating a flow of the facial feature extracting processing. Input in this processing is the registered image or the camera image, and the facial feature extracting unit 140 outputs the feature quantity of the face in the inputted image.

First, the object detecting unit 130 detects the region of a face from the input image as a rectangular region (S210). For detection of the face, for example, a method described in Rapid Object Detection using Boosted Cascade of Simple Features in Proceedings of the IEEE Conference on Computer Vision and Pattern Recognition by Viola and Jones (2001) is used. In the case of limiting the search target of the face image to the one of relatively good image quality, by limiting a detection range of the face to a predetermined size or larger, efficiency of the processing can be improved. The object detecting unit 130 records position coordinates in the image of the detected face region, in association with image data. Here, in the case that a face is not detected from the image, the following processing is skipped.

Next, based on the position of the face region in the image, the facial feature extracting unit 140 acquires a plurality of local images (S220).

An example of the local image to be acquired will be described using FIG. 5. In FIG. 5, a rectangle R of a solid line is defined as the face region detected in S210. In this example, images of rectangular areas P1 to P5 (a right eye corresponds to P1, a left eye corresponds to P2, a nose corresponds to P3, a right half of a mouth corresponds to P4, and a left half of the mouth corresponds to P5) in the face region are acquired as the local images based on the predetermined positional relation with the face region (for example, the relative positional relation to the center coordinate of the face region). The local regions are not limited to the example in FIG. 5 and left and right cheeks, both eyes, the whole mouth and the forehead or the like may be added.

Also, facial feature points such as outer corners of eyes, inner corners of eyes, or left and right ends of the mouth may be detected from the face region, and the local images may be acquired from relations with the position coordinates of the detected facial feature points. In the above-described face detecting method, since the positional relation between the detected face region and individual parts of the face change depending on a direction of the face, it is more accurate to acquire the local images based on positions of the facial feature points. As a method of detecting the positions of the facial feature points, for example, a method described in Face Detection, Pose Estimation, and Landmark Localization in the Wild in Proceedings of the IEEE Conference on Computer Vision and Pattern Recognition by Zhu and Ramanan (2012) is used.

Next, the facial feature extracting unit 140 extracts local features from the respective acquired local images, and defines them as the facial features (S230). As the facial features, for example, histograms of oriented gradients described in Histograms of Oriented Gradients for Human Detection in Proceedings of the IEEE Conference on Computer Vision and Pattern Recognition by Dalal and Triggs (2005) are used.

<Details of Similarity Degree Calculating Processing>

FIG. 6 is a flowchart illustrating a flow of the similarity degree calculating processing. In this processing, the facial features (local features) of the registered images and the camera images are inputted, and the similarity degree between the face images is output.

First, the partial similarity degree calculating unit 150 acquires the local features of the registered image and the camera image obtained in S200 and S400 (S510). Here, the partial similarity degree calculating unit 150 obtains the feature of the local region P1 illustrated in FIG. 5, for example.

Next, the partial similarity degree calculating unit 150 obtains the similarity degree of the two features obtained in S510 (S520). For example, a square norm of a difference between feature vectors when the two features are considered as vectors, is calculated as the similarity degree.

The partial similarity degree calculating unit 150 successively and repeatedly performs the processing of S510 to S520 for the respective local features, and obtains the similarity degrees for the number of the local regions.

Next, the similarity degree integrating unit 160 acquires the integration parameter for integrating the similarity degrees of the local features (S530). Here, the integration parameter is a parameter learned for each camera beforehand, and acquired according to each of N cameras used for photographing. A method of learning the integration parameter will be described later.

Then, using the integration parameter acquired in S530, the similarity degree integrating unit 160 integrates the similarity degrees of the local features (S540). Here, when the similarity degrees of the individual local features between the face images are defined as $s_k$ (k=1, 2, ..., N) and the integration parameters are defined as $w_k$ (k=1, 2, ..., N), the similarity degree integrating unit 160 obtains an integrated similarity degree s as a weighted total sum as in (Expression 1) below. N is the number of the local regions.

$$s = \sum_{k=1}^{N} w_k \cdot s_k \quad \text{(Expression 1)}$$

In the present embodiment, the similarity degree integrating unit 160 sets a high value during integration on the feature in the region of the right eye or the right half of the mouth, in the image photographed by the camera installed at a point where the face facing not the front but turning left is photographed (the integration parameter $w_k$ corresponding to the region of the right eye or the right half of the mouth is made large). Thus, the highly accurate integrated similarity degree s is obtained.

<Method of Learning Integration Parameter>

Figure 7:
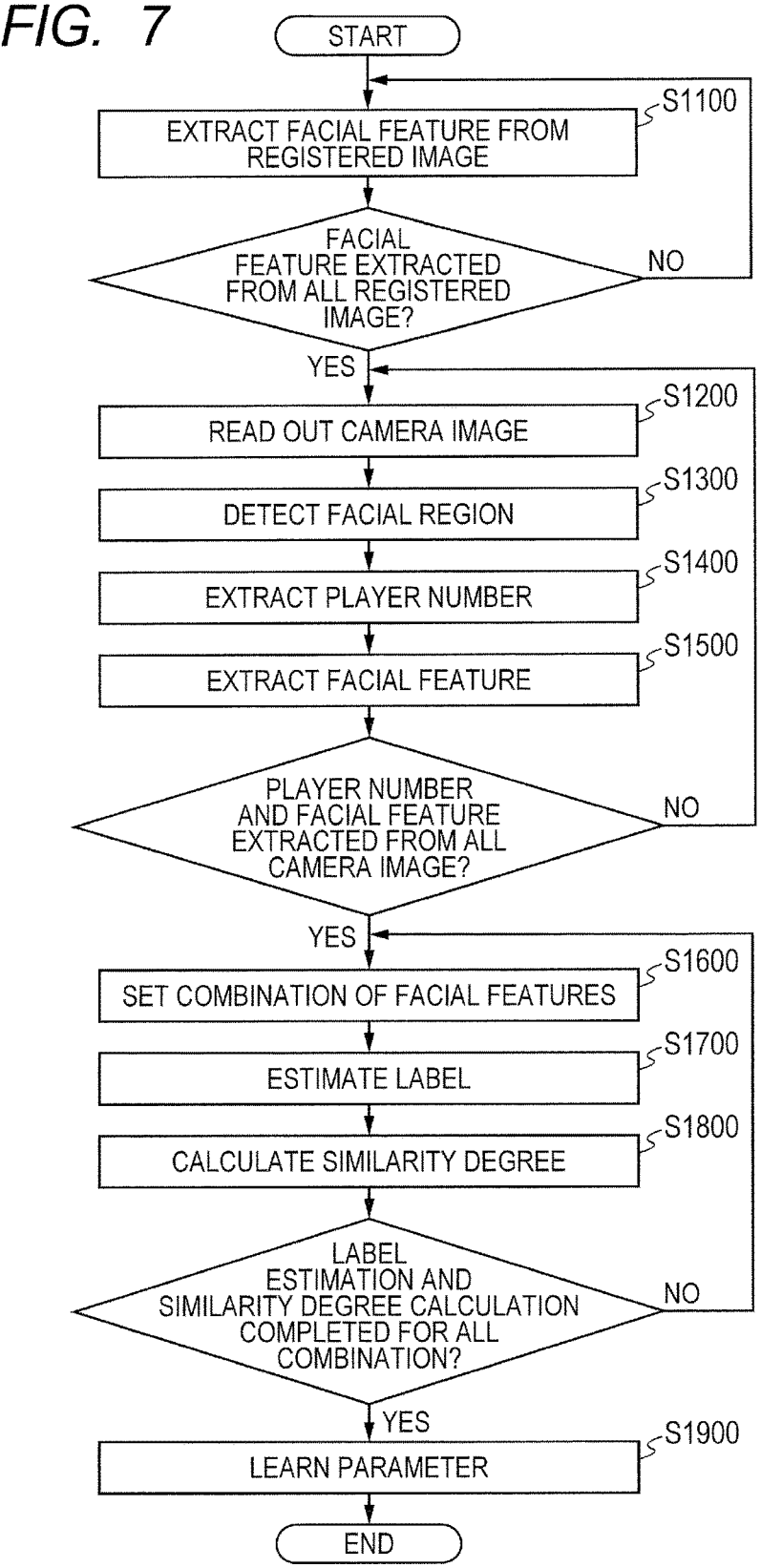
FIG. 7 is a flowchart illustrating a flow of learning of an integration parameter in the first embodiment.

FIG. 7 is a flowchart illustrating a flow of learning of the integration parameter. When learning the integration parameter, it is assumed that the registered images and the camera images are stored respectively in the registered image storage unit 110 and camera image storage unit 120 beforehand. Below, an example that the parameter learning unit 200 learns the integration parameter for the time of collating the face images photographed by the camera 11 will be described. Learning of the integration parameter in the other cameras is similarly performed.

First, the object detecting unit 130 selects one registered image, and detects the region of a face from the selected registered image. Then, the facial feature extracting unit 140 extracts a facial feature from the region of the face (S1100). It is the processing similar to S200 during the collation processing. The processing is repeated for all the images stored in the registered image storage unit 110, and the facial features of the registered images are obtained.

Next, the camera identifier acquiring unit 190 reads one camera image (S1200). Here, the camera identifier acquiring unit 190 acquires the identifier of the read camera image, and determines whether or not the read image is photographed by the camera 11 from the identifier. In the case of the image photographed by the camera 11, the following processing of S1300 to S1500 is performed, but the processing is skipped otherwise.

Next, the object detecting unit 130 detects the region of a face from the camera image as a rectangular region (S1300). It is the processing similar to S210 during the collation processing.

Next, the number extracting unit 170 extracts a player number from the camera image (S1400). It is the processing similar to player number extraction described in the collation processing. In the case that the player number is not extracted here, the following processing of S1500 is skipped. Also, in the case that a plurality of faces are detected from the camera image and the player numbers are extracted for the respective face images, the number extracting unit 170 records the extracted player numbers for the respective face images.

Next, based on the position of the face region in the image, the facial feature extracting unit 140 acquires a plurality of local images, and extracts the facial features (S1500). It is the processing similar to S220 to S230 during the collation processing.

For all the camera images stored in the camera image storage unit 120, the processing of S1200 to S1500 is repeated, and the player numbers and the facial features are obtained for the faces in the camera images.

Next, the label estimating unit 180 sets one combination of the facial feature of the registered image and the facial feature in the face image in the camera image (S1600).

Then, the label estimating unit 180 compares the player number stored as the identifier of the person in association with the registered image with the player number extracted from the position corresponding to the person of the face in the camera image, and attaches the label of the identical person when the numbers coincide and the label of a different person when the numbers do not coincide (S1700). For example, the label is expressed by a symbol 0 or 1 of 1 bit, the identical person is defined as 1 and the different person is defined as 0.

Next, the partial similarity degree calculating unit 150 calculates the similarity degrees for the respective local features of the registered image and the face image in the camera image (S1800). It is the processing similar to S520 during the collation processing. The processing of S1600 to S1800 is repeated for all the combinations of the registered image and the face image in the camera image, and sets of the similarity degrees for the respective local features and the estimated label are obtained.

Next, the parameter learning unit 200 learns the integration parameter using the similarity degrees of the local features and the estimated label that are obtained (S1900). Here, the parameter learning unit 200 obtains the parameter $w=\{w_1, w_2, \ldots, w_N\}$ by optimization of the following (Expression 2). That is, the parameter w is a set of the parameters $w_k$ that minimize E in (Expression 3).

$$w = \arg\min E \quad \text{(Expression 2)}$$

$$E = \sum_{i=1}^{M} (w \cdot x_i - y_i)^2 \quad \text{(Expression 3)}$$

Here, $x_i$ in (Expression 3) is one of vectors $x=\{S_1, S_2, \ldots, S_N\}$ for which the similarity degrees of the local features are combined, and $y_i$ is the estimation label thereof. An index of the face image used in learning is expressed by i, and M is the number of samples of the face image used in learning. In (Expression 3), a first term inside parentheses is an inner product of the parameter w and the vector $x_i$.

In the case that the person in the registered image and the person in the camera image are the identical person, since the inner product of the parameter w and the similarity degree of the local feature becomes a value close to 1 and the label $y_i$ is 1, a square of a value inside the parentheses becomes a value close to 0.

Also, in the case that the person in the registered image and the person in the camera image are the different persons, since the inner product of the parameter w and the similarity degree of the local feature becomes a value close to 0 and the label $y_i$ is 0, a square of the value inside the parentheses becomes a value close to 0.

Without being limited to this method, for learning the parameter, estimation may be performed using a support vector machine.

The integration parameter for the time of collating the face images photographed by the other cameras is learned similarly.

Second Embodiment

The present invention is also applicable to a use other than a search of photos of persons in a sports event. Another application example is a search of a specific person from video images of a plurality of monitoring cameras installed on the street. For example, a personal image projected on one monitoring camera is defined as a registered image and a person of a similar face or clothes is searched from the plurality of monitoring camera video images. In this case too, there are problems of individual cameras that a color of clothes is projected differently when an illumination condition is different and it is difficult to collate faces in a camera of a low resolution. These problems can be solved by the collation apparatus and method of the present invention. The application example is illustrated below. A hardware configuration and a system configuration in the present embodiment follow FIG. 10 and FIG. 2, respectively.

A main difference between the first embodiment and the second embodiment is that, while the label indicating whether or not it is the identical person is estimated based on the player number in the first embodiment, there is nothing that corresponds to the player number in the second embodiment.

In the second embodiment, the label indicating whether or not it is the identical person is estimated based on a collation result of the registered image and the camera image, and the integration parameter is learned using the label obtained in this way.

Figure 8:
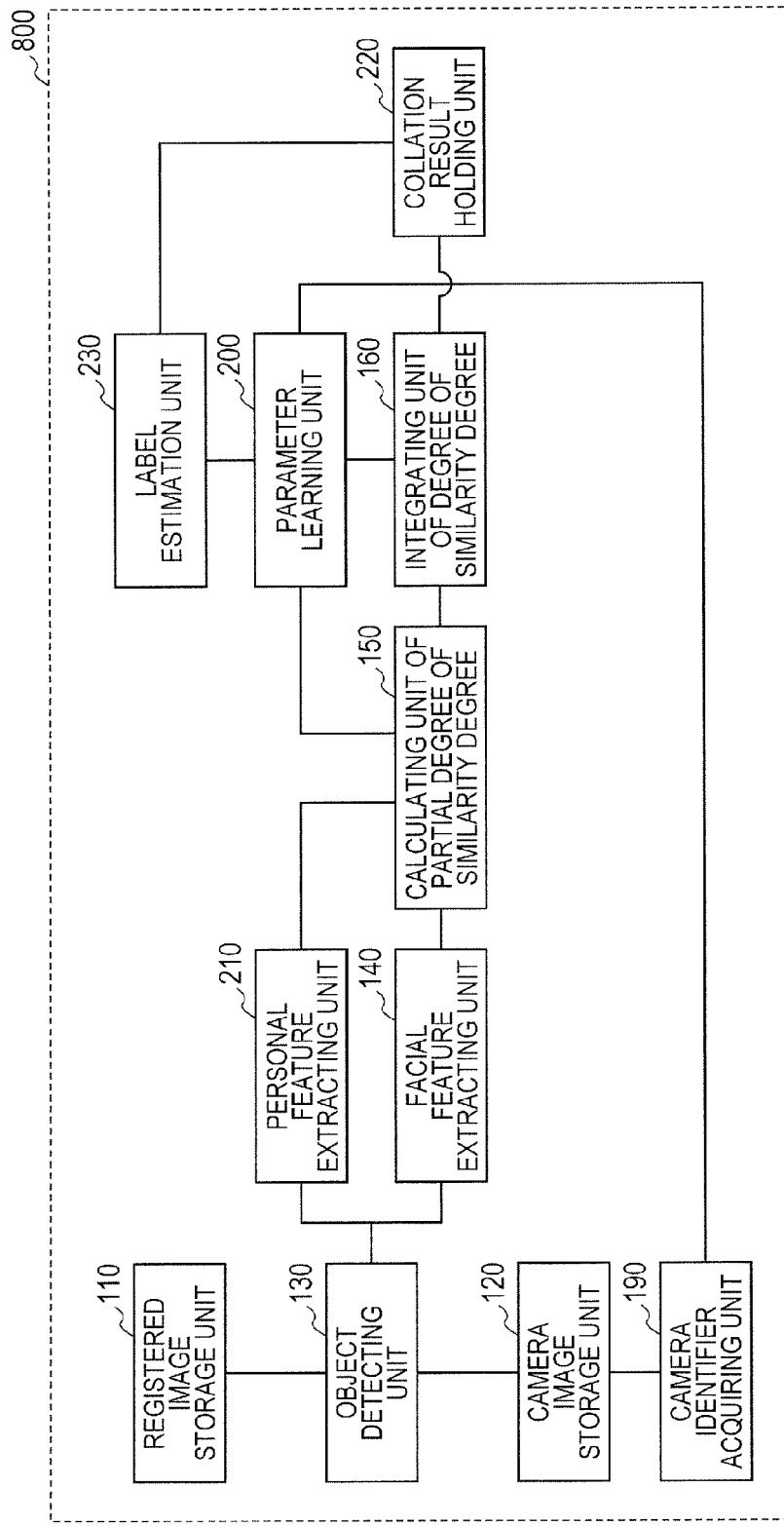
FIG. 8 is a diagram illustrating a functional configuration of a collation apparatus in a second embodiment.

FIG. 8 is a diagram illustrating a functional configuration of a collation apparatus 800 according to the present embodiment. In FIG. 8, components to which the same signs as in FIG. 1 are assigned have equivalent functions. Hereinafter, components illustrated only in FIG. 8 and components whose functions are different from that in FIG. 1 will be described.

A personal feature extracting unit 210 estimates positions of individual parts of a person from a position of a face detected by the object detecting unit 130, and extracts features of the individual parts. The features to be extracted are, for example, features related to properties of a person, such as a hairstyle, a color and whether or not a hat is on from a head part and a color of clothes and a shape of the body from a body part (called personal property features, hereinafter).

A collation result holding unit 220 holds a collation result for a combination of the predetermined number of features of the high similarity degree or the combination of the features of the low similarity degree, among the similarity degrees output by the similarity degree integrating unit 160. Here, the collation results to be held are the partial similarity degrees for the respective features, which are obtained in the partial similarity degree calculating unit 150.

A label estimating unit 230 attaches the label indicating whether or not it is the identical person to the collation result held in the collation result holding unit 220 (the collation result calculated based on the similarity degrees for the respective local features of the face and the similarity degrees for the respective personal property features).

Hereinafter, the operation of the present embodiment will be described. Since the image collation and image searching processing is almost the same as the processing in the first embodiment of the present invention illustrated in FIG. 3, description will be given referring to it.

First, the input apparatus 3 selects the image of the person desired to be searched from the images stored in the registered image storage unit 110 (S100). The image selected here is one of the video images of the cameras 11, 12, ..., 1N displayed at the output apparatus 4, and a personal image part in one of the plurality of video images is selected.

Next, the object detecting unit 130, the facial feature extracting unit 140, and the personal feature extracting unit 210 extract the local features of the face and the personal property features from the registered image (S200). In the present embodiment, as described above, the head feature of the person, the color of the clothes and the shape of the body are extracted as the personal property features, in addition to the features of the face.

Next, the object detecting unit 130 reads the images stored in the camera image storage unit 120 along a predetermined order (S300).

Next, the object detecting unit 130, the facial feature extracting unit 140, and the personal feature extracting unit 210 extract the local features of the face and the personal property features from the camera image (S400). When extracting personal features, the body part of the person or the like may be detected again based on the position of the detected face.

Next, the partial similarity degree calculating unit 150 and the similarity degree integrating unit 160 calculate and integrate the similarity degrees between the local features of the face and the personal property features of the registered image, that are extracted in S200, and the local features of the face and the personal property features of the camera image, that are extracted in S400 (S500). The collation apparatus 800 outputs the obtained similarity degree between the personal images.

Then, the searching result outputting unit 30 arranges in ranking and outputs the camera image from the similarity degrees between the personal images obtained in the collation apparatus 800 (S600). Here, for the integration parameter, the parameter learned for the respective cameras beforehand is used.

In the present embodiment, for example, the parameter w is determined so as to set a high value during the integration on the feature independent of variations of the color in the camera image photographed by the camera installed in an illumination environment different from an illumination environment for the time of photographing the registered image. Thus, the highly accurate similarity degree is obtained.

Next, a method of learning the integration parameter will be described. In the present embodiment, since the identifier is not attached to the person beforehand, a method of estimating a label of the personal image during learning is different from that in the first embodiment. In the present embodiment, the parameter is learned assuming that a set of the feature quantities of the registered image and the camera image indicating the high similarity degree among the once calculated similarity degrees as the identical person and a set of the feature quantities of the registered image and the camera image indicating the low similarity degree as the different person.

That is, the label $y_i$ of (Expression 3) corresponding to the "set of the feature quantities of the registered image and the camera image indicating the high similarity degree" is 1, and the label $y_i$ of (Expression 3) corresponding to the other "sets of the feature quantities of the registered image and the camera image" is 0.

The parameter is learned using the label $y_i$ obtained in this way, and the parameter w which is a set of the parameters $w_k$ that minimize E in (Expression 3) is obtained.

Figure 9:
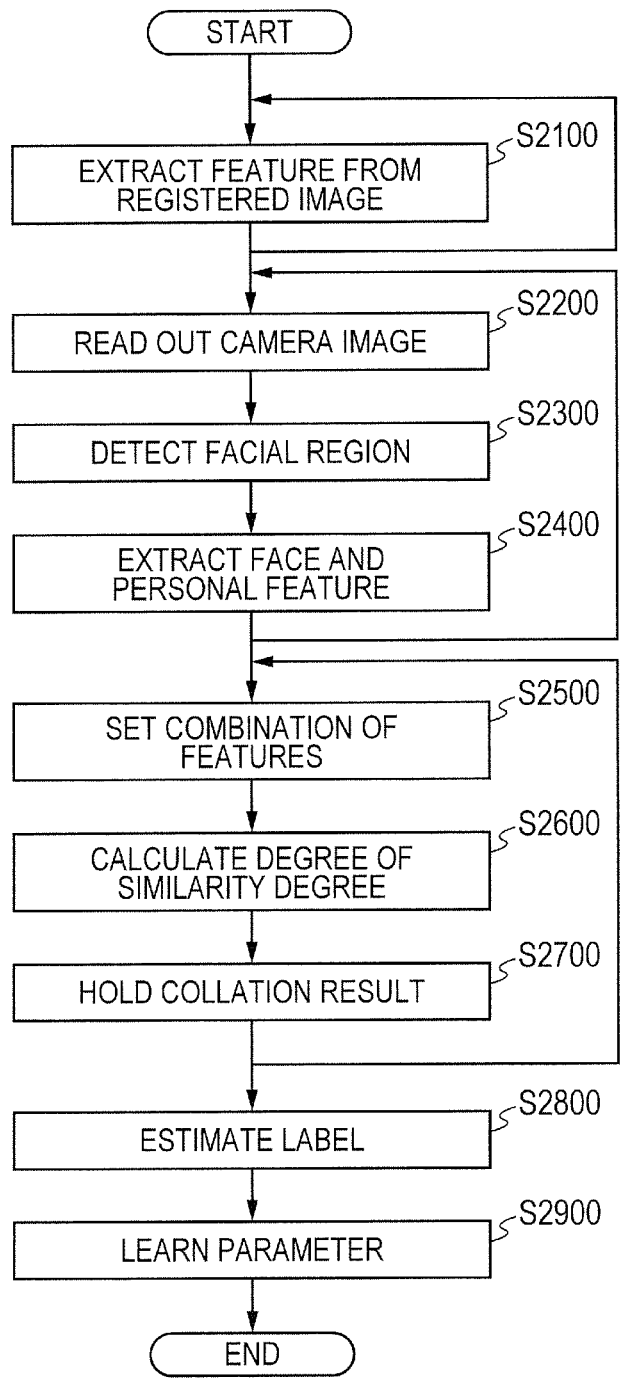
FIG. 9 is a flowchart illustrating a flow of learning of an integration parameter in the second embodiment.

FIG. 9 is a flowchart illustrating a flow of learning of the integration parameter. When learning the integration parameter, it is assumed that the registered images are stored in the registered image storage unit 110 and the camera images are stored in the camera image storage unit 120 beforehand. Below, an example of learning the integration parameter for the time of collating the face images photographed by the camera 11 will be described. Learning of the integration parameter in the other cameras is similarly performed.

First, the object detecting unit 130 selects one registered image and detects the region of a face, the facial feature extracting unit 140 extracts the feature of the face from the region of the face, and the personal feature extracting unit 210 extracts the personal property features from the regions of the body or the like corresponding to the region of the face (S2100). The processing is repeated for all the images stored in the registered image storage unit 110, and the local features of the face and the personal property features of the registered image are obtained.

Next, the camera identifier acquiring unit 190 reads one camera image (S2200). Here, from the identifier of the read camera image, whether or not the read image is the one photographed by the camera 11 is determined.

Next, the object detecting unit 130 detects the region of the face from the camera image as a rectangular region (S2300).

Next, based on the position of the face region in the image, the facial feature extracting unit 140 acquires a plurality of local images and extracts the local features of the face. Also, the personal feature extracting unit 210 extracts the plurality of personal property features (S2400).

The processing of S2200 to S2400 is repeated for all the camera images stored in the camera image storage unit 120, and the local features of the face and the personal property features are obtained for the face in the camera image.

Next, the partial similarity degree calculating unit 150 sets one combination of the face and the personal feature in the personal images in the registered image and the camera image (S2500).

Next, the partial similarity degree calculating unit 150 calculates the similarity degrees for the respective features between the personal image in the registered image and the personal image in the camera image, and the similarity degree integrating unit 160 integrates the similarity degrees of the plurality of features (S2600). First, the partial similarity degree calculating unit 150 obtains the similarity degrees of the individual local features of the face and the similarity degrees of the individual property features of the person for the respective features. Further, the similarity degree integrating unit 160 integrates the obtained similarity degrees for the respective features. At the time, the parameter used for the integration is an initial parameter, and the whole weight is 1 for example. The similarity degrees for the respective features are also held together with the integrated similarity degree.

Next, the collation result holding unit 220 holds a collation result for the combination of the features of the high similarity degree or the low similarity degree after the integration that is obtained in S2600 (S2700). In the case that the obtained similarity degree of the feature takes a high value of the predetermined number of high orders including the already obtained similarity degrees, the collation result holding unit 220 holds the obtained similarity degree. That is, in the case that the similarity degree takes the high value, the collation result holding unit 220 defines that it is the combination of the features of the identical person, and holds the similarity degree. Also, similarly, in the case that the obtained similarity degree of the feature takes a low value of the predetermined number of low orders including the already obtained similarity degrees, the obtained similarity degree is held.

The processing of S2500 to S2700 is repeated for all the combinations of the personal images in the registered image and the camera image, and the similarity degrees for the respective features are obtained. In the repeated processing, the similarity degrees obtained for the respective features for the combinations of the features of the predetermined number of the high order or low order integrated similarity degrees in the processing of S2600 are updated.

Next, the label estimating unit 230 attaches a label indicating whether or not it is the identical person to the similarity degrees for the respective features, that are held in the collation result holding unit 220 (S2800). That is, the label estimating unit 230 estimates that it is the identical person for the integrated similarity degree taking the high value of the high order, and it is the different person for the one taking the low value of the low order in the collation result holding unit 220, and attaches the label to the similarity degrees held for the respective features. Here, the similarity degrees to which the label is not imparted are not used in learning.

Next, using the obtained similarity degrees for the respective features and the estimated labels, the parameter learning unit 200 learns and updates the integration parameter (S2900).

The parameter may be learned by repeatedly using the learning method described above. For example, the parameter learning unit 200 may utilize the parameter updated in S2900 as the parameter of the similarity degree integration in S2600, and may repeat the processing of S2500 to S2900 again. By repetitive learning, the parameter of the higher accuracy can be obtained.

By the embodiment described above, in the image searching apparatus that searches a specific object from video images of a plurality of cameras, a highly accurate search for which a difference in camera installation conditions is taken into consideration can be embodied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-104004, filed May 20, 2014, which is hereby incorporated by reference herein in its entirety.

What is claimed is:

1. A collation apparatus for collating an input image with a plurality of registered images comprising:
   a processor; and
   a memory having stored thereon instructions that when executed by the processor, cause the processor to:
   extract a plurality of feature quantities from a region of an object in the input image;
   calculate, per each of the feature quantities, a plurality of similarity degrees between the plurality of feature quantities extracted from the input image and a corresponding plurality of feature quantities of a registered image among the plurality of registered images;
   integrate, using a parameter, the plurality of similarity degrees corresponding to the plurality of feature quantities into an integrated similarity degree;
   estimate as to whether the object in the input image is identical with an object in each of the plurality of registered images; and
   learn the parameter to be used to integrate the plurality of similarity degrees, based on a result of the estimation by the estimation unit and the integrated similarity degree.

2. The apparatus according to claim 1, further comprising instructions stored on the memory that when executed by the processor, cause the processor to extract an identifier of the object from a region in a predetermined positional relation to the region of the object in the input image, wherein
   the processor estimates as to whether the object in the input image is identical with the object in each of the plurality of registered images, based on the extracted identifier and an identifier preliminary added to the object in the registered image.

3. The apparatus according to claim 2, wherein
   the object is a face of a person, and the processor extracts a player number, as the identifier, from a region of a body corresponding to the face.

4. The apparatus according to claim 1, wherein
   the processor estimates as to whether the object in the input image is identical with the object in each of the plurality of registered images, based on the integrated similarity degree.

5. The apparatus according to claim 1, wherein the region of the object in the input image includes a plurality of local regions, and the extracted plurality of feature quantities include a feature quantity extracted from each of the plurality of local regions in the input image.

6. The apparatus according to claim 1, wherein
   the extracted plurality of feature quantities include a feature quantity relating to a property of the object.

7. The apparatus according to claim 1, wherein
   the input image is an image picked up by one of a plurality of imaging devices,
   the memory has stored thereon instructions that when executed by the processor, cause the processor to acquire an identifier of the one imaging device that picked up the input image, and
   the processor learns the parameter used to integrate the plurality of similarity degrees, per each acquired identifier.

8. An image searching apparatus configured to collate an input image with a plurality of registered images comprising:
   a processor; and
   a memory having stored thereon instructions that when executed by the processor, cause the processor to:
   extract a plurality of feature quantities from a region of an object in the input image;
   calculate, per each of the feature quantities, a plurality of similarity degrees between the plurality of feature quantities extracted from the input image and a corresponding plurality of feature quantities of a registered image among the plurality of registered images;
   integrate, using a parameter, the plurality of similarity degrees corresponding to the plurality of feature quantities into an integrated similarity degree;
   estimate as to whether the object in the input image is identical with an object in each of the plurality of registered images;
   learn the parameter to be used to integrate the plurality of similarity degrees, based on a result of the estimation and the integrated similarity degree;
   register the image; and
   output one or more images arranged in a ranking, based on the integrated similarity degree between the input image and each of the plurality of registered images.

9. A collation method for collating an input image with a plurality of registered images comprising:
   extracting a plurality of feature quantities from a region of an object in the input image;
   calculating, per each of the feature quantities, a plurality of similarity degrees between the plurality of feature quantities extracted from the input image and a corresponding plurality of feature quantities of a registered image among the plurality of registered images;
   integrating, using a parameter, the plurality of similarity degrees corresponding to the plurality of feature quantities into an integrated similarity degree;
   estimating as to whether the object in the input image is identical with an object in each of the plurality of registered images; and
   learning the parameter to be used in the integrating, based on a result of the estimation in the estimating and the integrated similarity degree.

10. An image searching method comprising:
    extracting a plurality of feature quantities from a region of an object in the input image;
    calculating, per each of the feature quantities, a plurality of similarity degrees between the plurality of feature quantities extracted from the input image and a corresponding plurality of feature quantities of a registered image among the plurality of registered images;

integrating, using a parameter, the plurality of similarity degrees corresponding to the plurality of feature quantities into an integrated similarity degree;

estimating as to whether the object in the input image is identical with an object in each of the plurality of registered images;

learning the parameter to be used in the integrating, based on a result of the estimation in the estimating and the integrated similarity degree;

registering the image; and outputting one or more images arranged in a ranking, based on the integrated similarity degree between the input image and each of the plurality of registered images.

11. A non-transitory computer-readable recording medium storing a computer-readable program for causing a computer to:

extract a plurality of feature quantities from a region of an object in the input image;

calculate, per each of the feature quantities, a plurality of similarity degrees between the plurality of feature quantities extracted from the input image and a corresponding plurality of feature quantities of a registered image among the plurality of registered images;

integrate, using a parameter, the plurality of similarity degrees corresponding to the plurality of feature quantities into an integrated similarity degree;

estimate as to whether the object in the input image is identical with an object in each of the plurality of registered images; and learn the parameter to be used to integrate the plurality of similarity degrees, based on a result of the estimation and the integrated similarity degree.

12. A non-transitory computer-readable recording medium storing a computer-readable program for causing a computer to:

extract a plurality of feature quantities from a region of an object in the input image;

calculate, per each of the feature quantities, a plurality of similarity degrees between the plurality of feature quantities extracted from the input image and a corresponding plurality of feature quantities of a registered image among the plurality of registered images;

integrate, using a parameter, the plurality of similarity degrees corresponding to the plurality of feature quantities into an integrated similarity degree;

estimate as to whether the object in the input image is identical with an object in each of the plurality of registered images;

learn the parameter to be used to integrate the plurality of similarity degrees, based on a result of the estimation and the integrated similarity degree;

register the image; and output one or more images arranged in a ranking, based on the integrated similarity degree between the input image and each of the plurality of registered images.

* * * * *